(12) United States Patent
Flumeri et al.

(10) Patent No.: US 12,466,475 B2
(45) Date of Patent: Nov. 11, 2025

(54) METHOD TO CONTROL A ROAD VEHICLE WITH REAR STEERING WHEELS

(71) Applicant: FERRARI S.p.A., Modena (IT)

(72) Inventors: Alessandro Flumeri, Modena (IT); Fabrizio Vasta, Modena (IT)

(73) Assignee: FERRARI S.P.A., Modena (IT)

( * ) Notice: Subject to any disclaimer, the term of this patent is extended or adjusted under 35 U.S.C. 154(b) by 326 days.

(21) Appl. No.: 17/724,793

(22) Filed: Apr. 20, 2022

(65) Prior Publication Data

US 2022/0363311 A1 Nov. 17, 2022

(30) Foreign Application Priority Data

May 12, 2021 (IT) .......................... 102021000012170

(51) Int. Cl.
*B62D 6/00* (2006.01)
*B62D 17/00* (2006.01)

(52) U.S. Cl.
CPC .............. *B62D 6/002* (2013.01); *B62D 6/001* (2013.01); *B62D 17/00* (2013.01)

(58) Field of Classification Search
CPC ........ B62D 6/002; B62D 6/001; B62D 17/00; B62D 6/003; B62D 7/159; B62D 15/025
USPC ........................................................ 180/204
See application file for complete search history.

(56) References Cited

U.S. PATENT DOCUMENTS

2008/0054577 A1 * 3/2008 Horiuchi .................. B62D 6/02
280/5.522
2019/0315396 A1 * 10/2019 Yamamoto ......... B62D 15/0265

FOREIGN PATENT DOCUMENTS

DE 102015011704 A1 * 3/2017 ............. B62D 17/00
JP 2009126497 A * 6/2009

OTHER PUBLICATIONS

Italian Search Report for Application No. 102021000012170 mailed Jan. 12, 2022.

* cited by examiner

*Primary Examiner* — Scott A Reinbold
(74) *Attorney, Agent, or Firm* — CANTOR COLBURN LLP

(57) ABSTRACT

A method to control a road vehicle with rear steering wheels and having, while driving along a curve, the steps of: determining a desired steering angle for the rear wheels; comparing the desired steering angle with a threshold value; applying, while driving along a curve and if the desired steering angle is greater than the threshold value, to both rear wheels a same actual steering angle that is equal to the desired steering angle; and applying, while driving along a curve and if the desired steering angle is smaller than the threshold value, to a rear wheel on the outside of the curve an actual steering angle greater than the desired steering angle and applying to a rear wheel on the inside of the curve a zero actual steering angle.

10 Claims, 4 Drawing Sheets

METHOD TO CONTROL A ROAD VEHICLE WITH REAR STEERING WHEELS

CROSS-REFERENCE TO RELATED APPLICATIONS

This patent application claims priority from Italian Patent Application No. 102021000012170 filed on May 12, 2021, the entire disclosure of which is incorporated herein by reference.

TECHNICAL FIELD

The invention relates to a method to control a road vehicle with rear steering wheels.

BACKGROUND ART

Four wheel steering vehicles, also known as 4WS vehicles, have been produced by the automotive industry for many years, even though there are not many available models, which are mainly based on passive mechanical system, which only allow "fixed" steering angles to be imparted to the rear wheels. In these passive mechanical systems, the rear wheels are coupled to the front wheels so as to impart fixed steering angles to the rear wheels when the front wheels are steered.

More modern, dynamic systems, which are provided with an (electric or hydraulic) active actuator controlled by an electronic control unit, allow the steering of the rear wheels to be controlled by imparting, to the rear wheels, steering angles that are variable within a predetermined range.

While driving along a curve at a high speed (for example exceeding 60 km/h), the steering of the rear wheels increases the stability of the vehicle, in particular close to a grip loss; in order to improve the stability of the vehicle while it drives along a curve at a high speed, the rear wheels are caused to steer in phase (namely, in the same direction as the steering of the front wheels, which means that, when the front wheels steer to the right, the rear wheels steer to the right as well) in order to reduce the yaw angle, thus making it easier for the vehicle to be controlled. In other words, the in-phase steering of the rear wheels counters the centrifugal force that tends to cause the rear part of the vehicle to skid while driving along the curve, thus allowing the rear part of the vehicle to adapt to the ideal trajectory, increasing stability and effectiveness. In this situation, the rear wheels are caused to steer with a steering angle that usually is smaller than 1-2° and depends on the steering angle of the front wheels.

In case of manoeuvres at a low speed (for example up to 60 km/h), the steering of the rear wheels significantly decreases the steering radius, in particular, in order to increase the maneuverability of the vehicle at a low speed, the rear wheels are caused to steer in counter-phase (namely, in an opposite direction relative to the steering of the front wheels, which means that, when the front wheels steer to the right, the rear wheels steer to the left and vice versa) with a maximum steering angle of 3-5°, depending on the steering angle of the front wheels.

Patent application EP3153382A1 discloses a method to control, while driving along a curve, a road vehicle with rear steering wheels, wherein the rear steering wheels are always steered together in the same identical manner (namely, with the same degree of rotation).

Patent application DE102015011704A1 describes a method to generate and control a transverse driving behaviour of a vehicle, wherein the toe angle of a rear wheel on the inside of the curve is controlled independently of a toe angle of a rear wheel on the outside of the curve; in particular, in order to generate a transverse driving behaviour of the vehicle, the toe angle of the rear wheel on the inside of the curve is set to a positive value and/or the toe angle of the rear wheel on the outside of the curve is set to a negative value.

Patent application JP2009126497A discloses a device to control the toe angle of the rear wheels of the a vehicle; in order to reduce the wear of the tyre of a rear wheel on an inner side of the curve and in order to also generate the lateral force in an efficient manner, when the vehicle is driving along a curve, the toe angles of the left and right rear wheels can be controlled in an independent manner, also depending on the longitudinal acceleration/deceleration value.

DESCRIPTION OF THE INVENTION

The object of the invention is to provide a method to control a road vehicle with rear steering wheels, which optimizes performances in all operating conditions.

According to the invention, there is provided a method to control a road vehicle with rear steering wheels according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
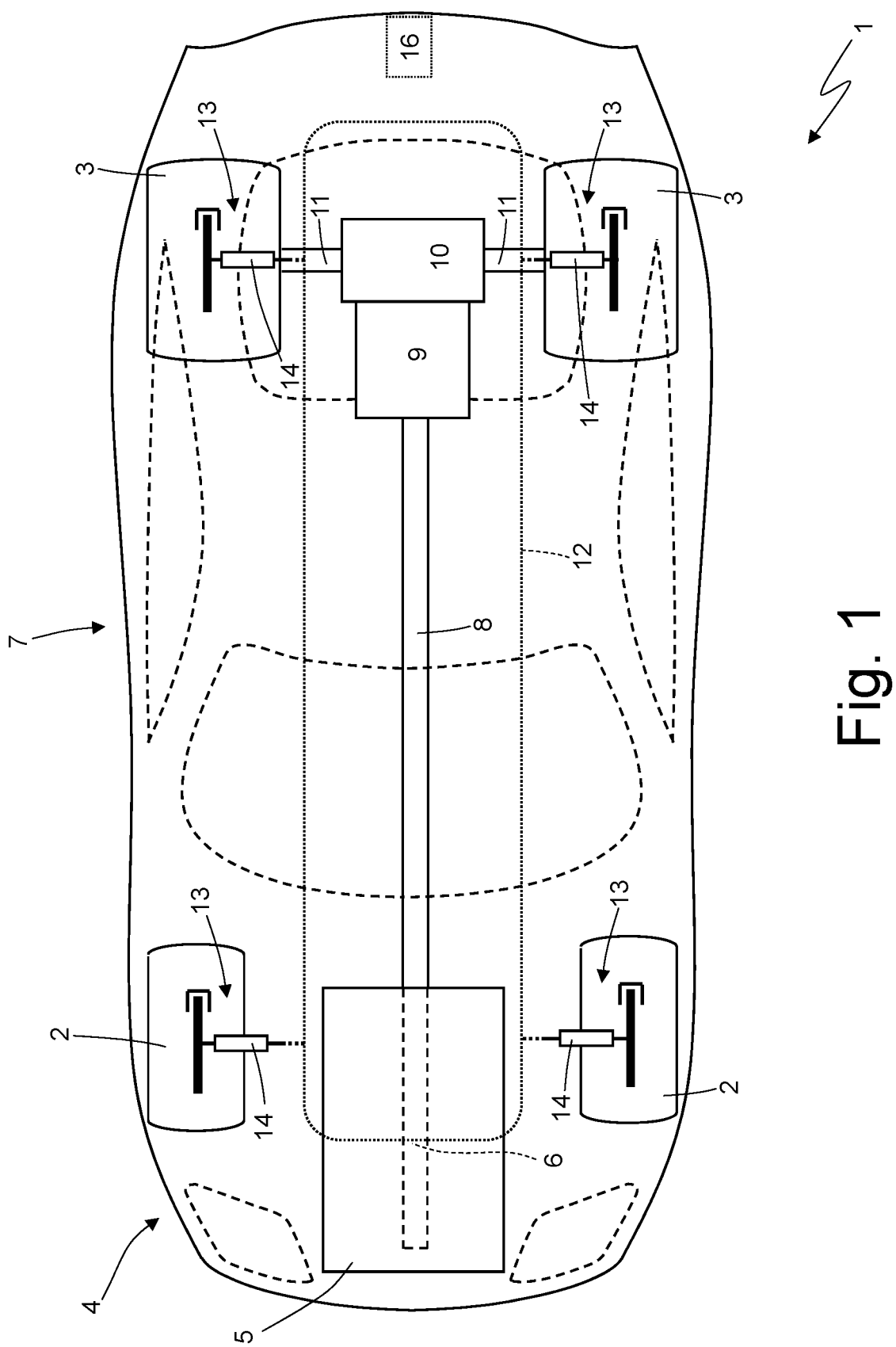
FIG. 1 is a schematic plan view of a road vehicle provided with rear steering wheels, which are controlled according to the invention.

In FIG. 1, reference number 1 indicates, as a whole, a road vehicle provided with two front wheels 2 and two rear drive wheels 3, which receive the torque from a powertrain system 4.

The powertrain system 4 comprises an internal combustion heat engine 5, which is arranged in a front longitudinal position and is provided with a crankshaft 6, and a servo-assisted drivetrain 7, which transmits the torque generated by the internal combustion engine 5 to the rear wheels 3 and has the configuration referred to as "transaxle". The drivetrain 7 comprises a drive shaft 8, which, on one side, is connected to the crankshaft 6 and, on the other side, is mechanically connected to a transmission 9, which is provided with at least one clutch and is arranged in a rear longitudinal position. The transmission 9 is connected, in a train-like manner, to an electronically controlled self-locking differential 10, from which a pair of axle shafts 11 start, each integral to a respective rear wheel 3. Obviously, the powertrain system 4 could be configured in a different manner: the internal combustion engine 5 could be arranged in a central or rear position, could be supported by one or more electric motors or could be replaced by one or more electric motors.

Each wheel 2 or 3 is mechanically connected to a frame of the road vehicle 1 by means of a suspension 13 (partially shown on FIG. 1), which is provided with an electronically controlled actuator 14, which allows both the elastic stiffness and the damping of the suspension element to the changed (increased or decreased).

Figure 2:
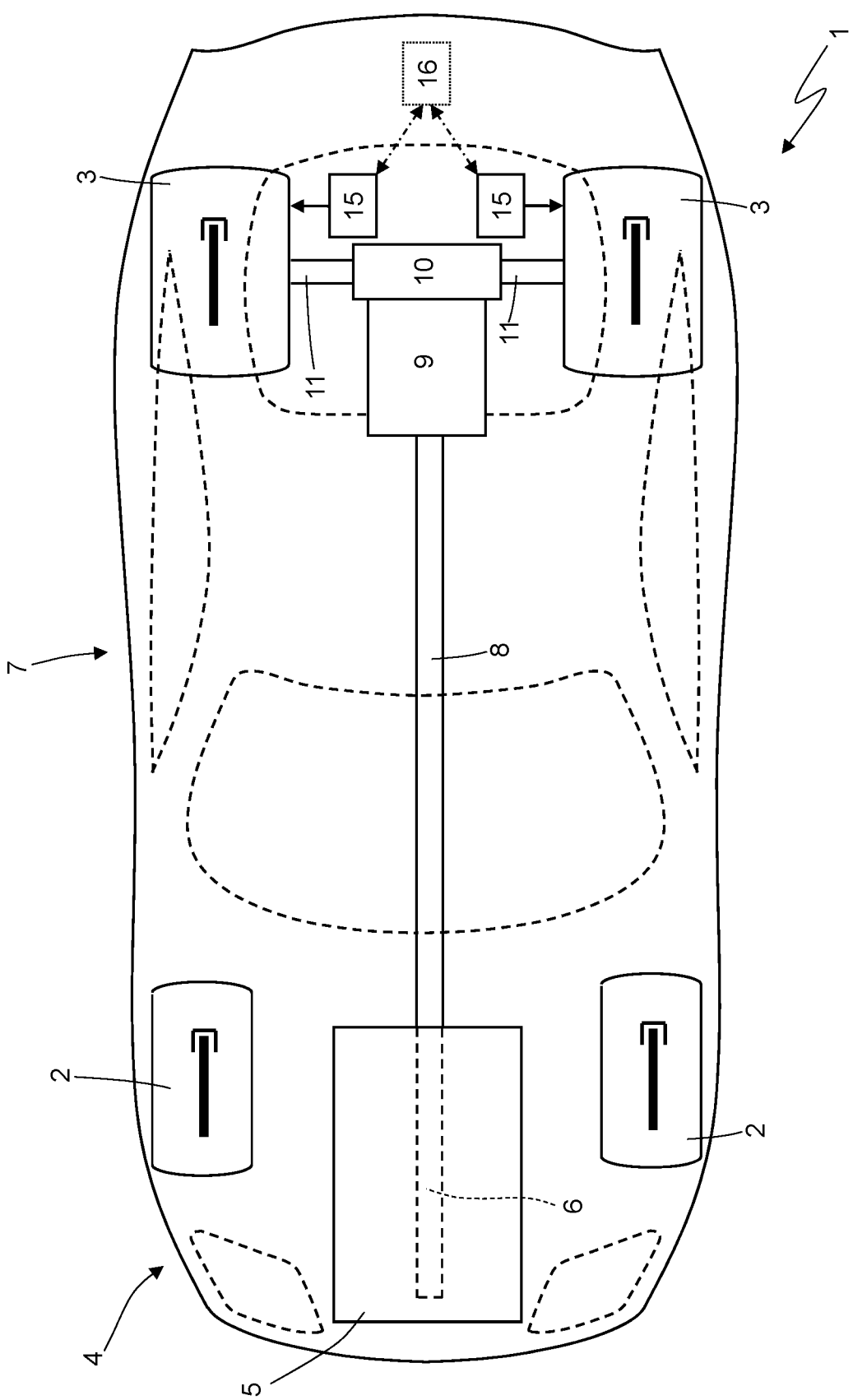
FIG. 2 is a schematic plan view of the road vehicle of FIG. 1, highlighting a rear wheel steering mechanism.

According to FIG. 2, the rear drive wheels 3 are steering wheels, namely they are carried by the corresponding suspensions 13 so that they can rotate to the right or to the left around a vertical axis in order to change the corresponding steering angle α (shown in FIGS. 3 and 4); in particular, two (electric or, alternatively, hydraulic) actuators 15 are provided, which are independent of one another and each actively control the variation of the steering angle α of a corresponding rear wheel 3. It should be pointed out that the two actuators 15 are completely independent of one another and, therefore, each actuator 15 can impart to its own rear wheel 3 a steering angle α that is different from a steering angle α of the other rear wheel 3.

While driving along a curve at a high speed (for example exceeding 60 km/h), the steering of the rear wheels 3 increases the stability of the road vehicle 1; in particular, in order to improve the stability of the road vehicle 1 while it drives along a curve at a high speed, the rear wheels 3 are caused to steer in phase (namely, in the same direction as the steering of the front wheels 2, which means that, when the front wheels 2 steer to the right, the rear wheels 3 steer to the right as well). In other words, the in-phase steering of the rear wheels 3 counters the centrifugal force that tends to cause the rear part of the vehicle to skid while driving along the curve, thus allowing the rear part of the vehicle to adapt to the ideal trajectory, increasing stability and effectiveness. In this situation, the rear wheels 3 are caused to steer with a steering angle α which usually is smaller than 1-2° and normally depends on the steering angle of the front wheels 2 (namely, the greater the steering angle of the front wheels 2, the greater the steering angle α of the rear wheels 3).

In case of manoeuvres at a low speed (for example up to 60 km/h), the steering of the rear wheels 3 significantly decreases the steering radius; in particular, in order to increase the maneuverability of the road vehicle 1 at a low speed, the rear wheels 3 are caused to steer in counter-phase (namely, in an opposite direction relative to the steering of the front wheels 2, which means that, when the front wheels 2 steer to the right, the rear wheels 3 steer to the left and vice versa) with a maximum angle of 3-5°, depending on the steering angle of the front wheels 2 (namely, the greater the steering angle of the front wheels 2, the greater the steering angle α of the rear wheels 3).

The road vehicle 1 comprises an electronic control unit 16 ("ECU"), which among other things, controls the actuators 15 to control the steering angle α of each rear wheel 3. The control unit 16 can physically consist of one single device or of different devices separate from one another and communicating with one another through the CAN network of the road vehicle 1.

When the road vehicle 1 is driving along a curve, the control unit 16 determines (in a known manner) a desired steering angle $\alpha_{TGT}$ for the rear wheels 3.

Figure 3:
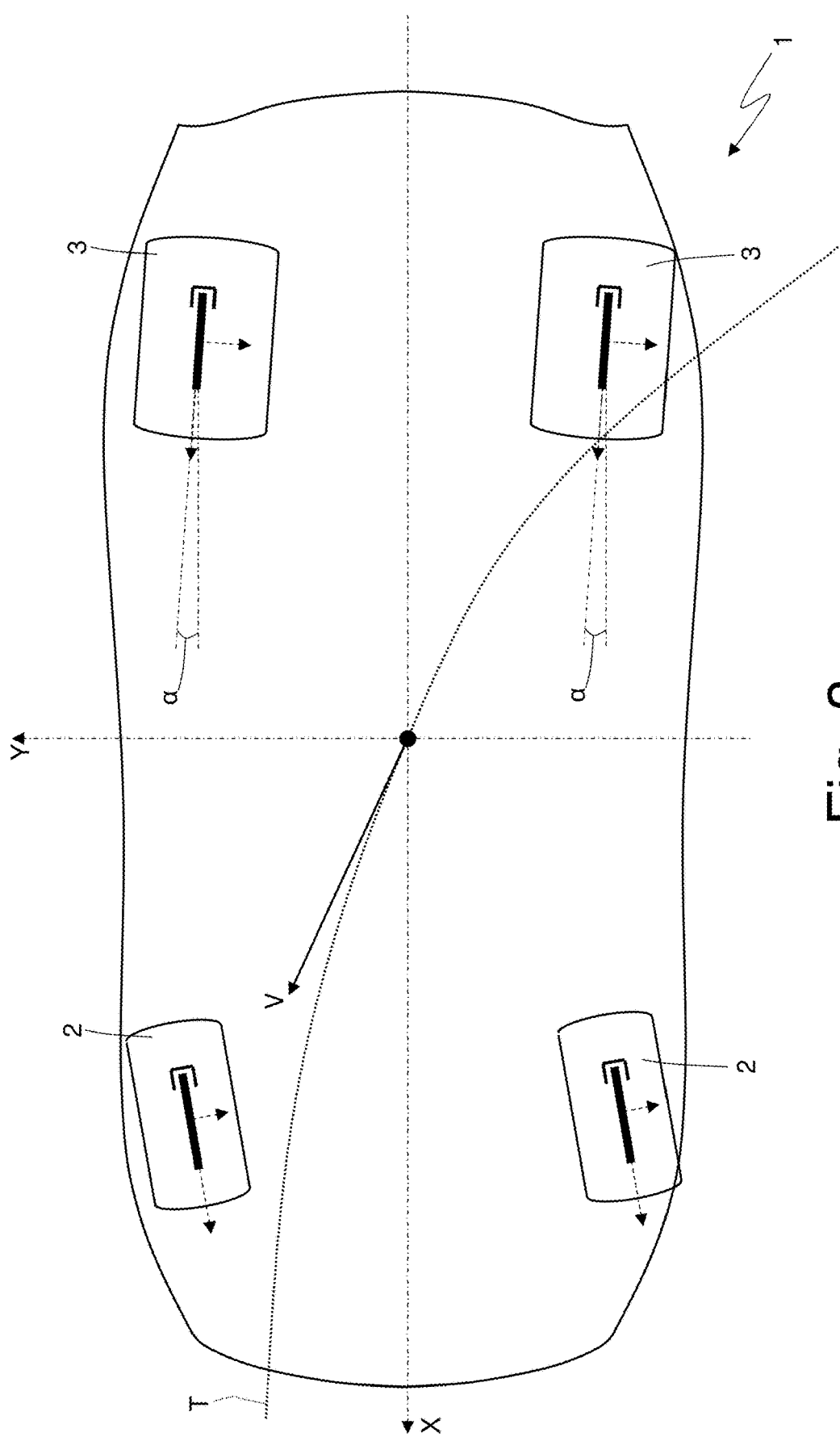
FIGS. 3 and 4 are two schematic plan views of the road vehicle of FIG. 1 while driving along a curve, highlighting the steering angle of the rear wheels according to two different control modes.
Figure 4:
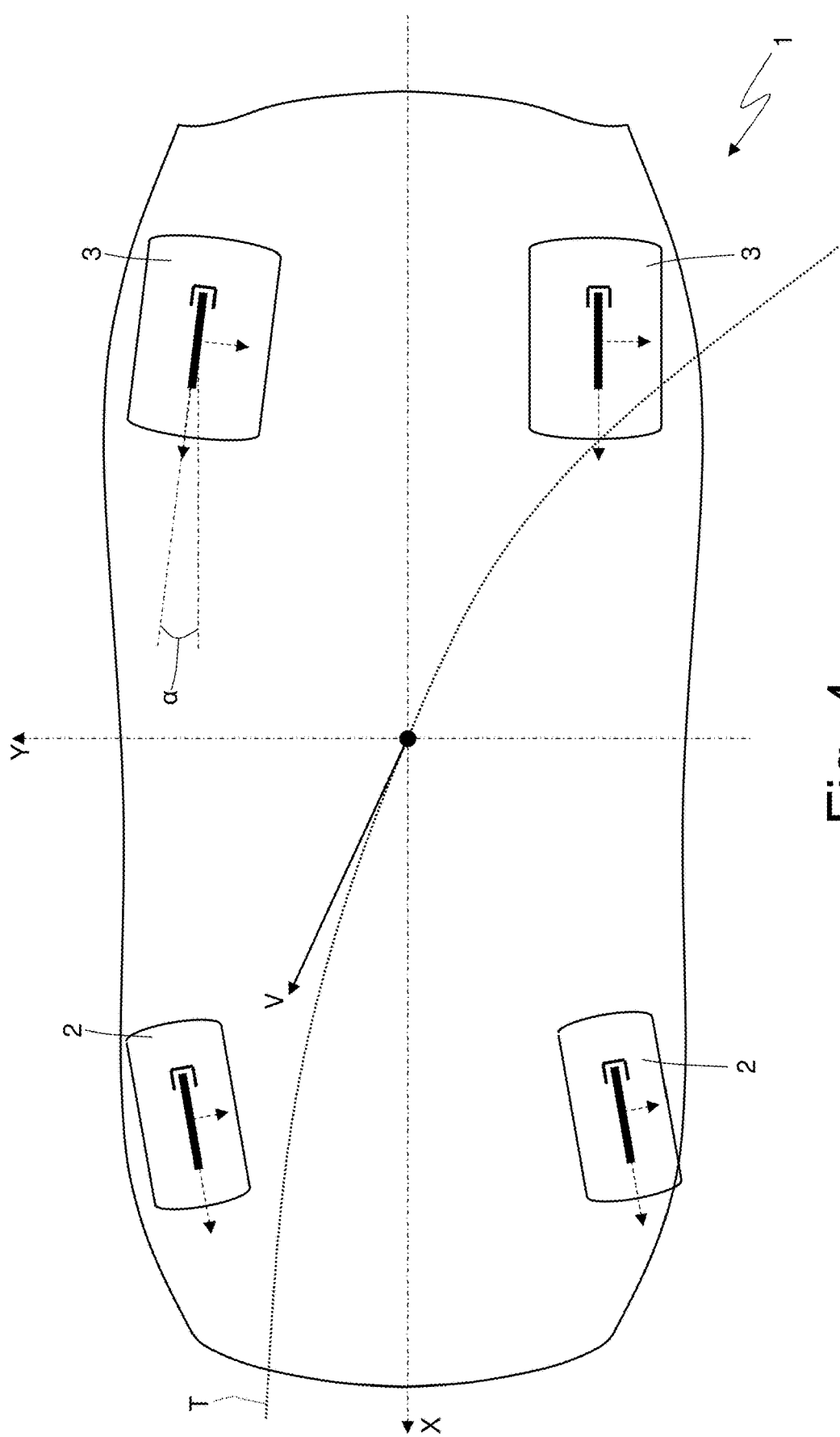

Subsequently, the control unit 16 compares the desired steering angle $\alpha_{TGT}$ with a threshold value TH: while driving along a curve and if the desired steering angle $\alpha_{TGT}$ is greater than the threshold values TH, the control unit 16 controls the two actuators 15 so as to apply to both rear wheels 3 a same actual steering angle α that is equal to the desired steering angle $\alpha_{TGT}$ (as shown in FIG. 3) or, while driving along a curve and if the desired steering angle $\alpha_{TGT}$ is smaller than the threshold value TH, the control unit 16 controls the two actuators 15 so as to apply to a rear wheel 3 on the outside of the curve an actual steering angle α greater than the desired steering angle $\alpha_{TGT}$ and so as to apply to a rear wheel 3 on the inside of the curve a zero actual steering angle α.

According to a preferred embodiment, the actual steering angle α applied to the rear wheel 3 on the outside of the curve, if the desired steering angle $\alpha_{TGT}$ is smaller than the threshold value TH, ranges from 150% and 220% of the desired steering angle $\alpha_{TGT}$.

In particular, the actual steering angle α applied to the rear wheel 3 on the outside of the curve, if the desired steering angle $\alpha_{TGT}$ is smaller than the threshold value TH, is twice the desired steering angle $\alpha_{TGT}$.

It should be pointed out that the actuators 15 can offer an ideal performance (especially in terms of promptitude of response, namely in terms of response dynamic in frequency) only when they have to operate an actual steering angle α that is sufficiently wide (namely, greater than the threshold value TH), whereas their performance is less acceptable (especially in terms of promptitude of response, namely in terms of response dynamic in frequency) when they have to operate an actual steering angle α that is too small. As a consequence, when the desired steering angle $\alpha_{TGT}$ is sufficiently wide (namely, greater than the threshold value TH), it is preferable (more convenient) to apply the same actual steering angle α equal to the desired steering angle $\alpha_{TGT}$ to both rear wheels 3 (which, hence, act in the same way), whereas, when the desired steering angle $\alpha_{TGT}$ is too small, it is preferable (more convenient) to apply an actual steering angle α that is larger than (for example, twice) the desired steering angle $\alpha_{TGT}$ to the sole rear wheel 3 on the outside of the curve and a zero actual steering angle α to the rear wheel 3 on the inside of the curve. In other words, when the desired steering angle $\alpha_{TGT}$ is sufficiently wide, it is preferable (more convenient) to steer both rear wheels 3 in the same way, whereas, when the desired steering angle $\alpha_{TGT}$ is too small, it is preferable (more convenient) to steer the sole rear wheel 3 on the outside of the curve to a greater extent, thus not steering the rear wheel 3 on the inside of the curve.

According to a preferred embodiment, the threshold value TH ranges from 0.2° to 0.4° and, preferably, is equal to 0.3°. According to a simpler embodiment, the threshold value TH is always constant in all conditions; according to a different embodiment, the threshold value TH is variable depending on a longitudinal speed of the road vehicle 1, depending on a transverse acceleration of the road vehicle 1 (which obviously is not zero while driving along a curve) and/or depending on an actual steering angle of the front wheels 2 (which obviously is not zero while driving along a curve).

When the road vehicle 1 is driving along a straight road (namely, the steering angle of the front wheels 3 substantially is zero) at a constant speed, the control unit 16 applies to both rear wheels 3 two equal (in modulus) and contrary (in phase) actual steering angles α so as to reduce a toe of the rear wheels 3 relative to a static toe determined by the geometry of the suspensions, namely to confer to the rear wheels 3 a (temporarily) decreased toe; according to a possible embodiment, when the road vehicle 1 is driving along a straight road at a constant speed, the control unit 16 applies to both rear wheels 3 two equal and contrary actual steering angles α so as to cancel the static toe determined by the geometry of the suspensions, namely to confer to the rear wheels 3 a zero toe. Preferably, the reduction (cancellation) of the toe of the rear wheels 3 is carried out only if the road vehicle 1 drives along a straight road at a constant speed for a sufficiently long time (for example, when driving on a motorway), for instance when the longitudinal speed is constant and the steering angle of the front wheels 2 substantially is zero, without interruptions, for an amount of time exceeding, for example, 45-90 seconds. The reduction (cancellation) of the toe of the rear wheels 3 reduces fuel consumptions, but also reduces stability and promptitude of response and, therefore, is useful while cruising, when the road vehicle 1 drives along long stretches of road at a substantially constant and relatively low speed (compared to the maximum speed that can theoretically be reached by the road vehicle 1).

When the road vehicle 1 is driving along a straight road (namely, the steering angle of the front wheels 3 substantially is zero) at a variable speed (namely, significantly accelerating or decelerating), the control unit 16 applies to both rear wheels 3 two equal (in modulus) and contrary (in phase) actual steering angles $\alpha$ so as to increase a toe of the rear wheels 3 relative to a static toe determined by the geometry of the suspensions, namely to confer to the rear wheels 3 a (temporarily) increased to. The increase of the toe of the rear wheels 3 increases stability and promptitude of response and, therefore, is useful during a strong acceleration or a strong deceleration to help keep the road vehicle 1 straight (avoiding undesired "drifts").

In other words, the control unit 16 determines whether the vehicle 1 is driving along a straight road and, hence, applies, while driving along the straight road, to both rear wheels 3 two equal and contrary actual steering angles $\alpha$ so as to change a toe of the rear wheels 3 relative to a static toe determined by the geometry of the suspensions: the toe of the rear wheels 3 is decreased if the road vehicle 1 is driving at a constant speed in order to reduce consumptions, whereas the toe of the rear wheels 3 is increased if the road vehicle 1 is driving at a variable speed, namely accelerating or decelerating, in order to increase stability and promptitude of response.

It should be pointed out that the toe variation carried out by the control unit 16 when the road vehicle 1 is driving along a straight road at a constant speed and by applying to both rear wheels 3 two equal and contrary actual steering angles $\alpha$ entails applying relatively wide actual steering angles $\alpha$ (greater than the threshold value TH) and, hence, can anyway promptly intervene (i.e. with a good response dynamic in frequency) in case of a strong acceleration or of a strong deceleration. On the other hand, the toe variation carried out by the control unit 16 when the road vehicle 1 is driving along a straight road at a constant speed and by applying to both rear wheels 3 two equal and contrary actual steering angles $\alpha$ entails applying moderate actual steering angles $\alpha$ (smaller than the threshold value TH), but, in this situation, there is absolutely no need for a prompt intervention (i.e. with a high response dynamic in frequency) since the road vehicle 1 clearly is in stationary condition and the intervention on the steering of the rear wheels 3 is carried out to have an effect over time.

The embodiments described herein can be combined with one another, without for this reason going beyond the scope of protection of the invention.

The control method described above has different advantages.

First of all, the control method described above improves the overall performances provided by the steering of the rear wheels 3 while driving along a curve, for it manages to (at least partially) overcome the limits of the actuators 15, which offer a fairly inadequate performance (especially in terms of promptitude of response, namely in terms of response dynamic in frequency) when they have to operate an actual steering angle $\alpha$ that is too small. Obviously, assuming to have ideal actuators 15 available, it would be preferable to apply to both rear wheels 3 a same actual steering angle $\alpha$ equal to the desired steering angle $\alpha_{TGT}$ while driving along a curve; however, since the actuators 15 are real and not ideal, it is necessary to take into account their limits, which are at least partly masked by applying, while driving along a curve and if the desired steering angle $\alpha_{TGT}$ is smaller than the threshold value TH, to the rear wheel 3 on the outside of the curve an actual steering angle $\alpha$ greater than the desired steering angle $\alpha_{TGT}$ and to the rear wheel 3 on the inside of the curve a zero actual steering angle $\alpha$.

Furthermore, the control method described above optimizes the behaviour of the road vehicle 1 on a straight road, reducing consumptions at a constant speed and increasing stability and promptitude of response at a variable speed.

The control method described above is particularly safe, as it always keeps the road vehicle 1 under control and is always able to quickly and effectively take action in case of need.

The control method described above maximizes the dynamic response speed of the vehicle following a steering command requested by the driver to the front wheel 2.

Finally, the control method described above is simple and economic to be implemented, since it only requires software changes (namely, it does not require hardware changes) and does not require either a significant calculation ability or a large memory space.

LIST OF THE REFERENCE NUMBERS OF THE FIGURES

1 vehicle
2 front wheels
3 rear wheels
4 powertrain system
5 engine
6 crankshaft
7 drivetrain
8 drive shaft
9 mechanical transmission
10 self-locking differential
11 axle shafts
12 frame
13 suspension
14 actuator
15 actuator
16 control unit
$\alpha_{TGT}$ desired steering angle
$\alpha$ actual steering angle
TH threshold value

The invention claimed is:

1. A method to control a road vehicle (1) with rear steering wheels (3); wherein the road vehicle (1) comprises two actuators (15), which are independent of one another and each actively controls the variation of a steering angle ($\alpha$) of a corresponding rear wheel (3) so that each actuator (15) can impart to its own rear wheel (3) a steering angle ($\alpha$) that is different from a steering angle ($\alpha$) of the other rear wheel (3); the method comprises, while driving along a curve, the steps of:

determining a threshold value (TH) different from an actual steering angle ($\alpha$) of the rear wheels (3);

determining a desired steering angle ($\alpha_{TGT}$) for the rear wheels (3);

comparing the desired steering angle ($\alpha_{TGT}$) with the threshold value (TH);

in response to the desired steering angle ($\alpha_{TGT}$) being greater than the threshold value (TH), applying to both rear wheels (3) a same actual steering angle ($\alpha$) that is equal to the desired steering angle ($\alpha_{TGT}$); and in response to the desired steering angle ($\alpha_{TGT}$) being smaller than the threshold value (TH), applying to a rear wheel (3) on the outside of the curve an actual steering angle ($\alpha$) greater than the desired steering angle ($\alpha_{TGT}$) and applying to a rear wheel (3) on the inside of the curve a zero actual steering angle ($\alpha$).

2. The control method according to claim 1 and comprising the further step of applying, while driving along the curve, and in response to the desired steering angle ($\alpha_{TGT}$) being smaller than the threshold value (TH), to the rear wheel (3) on the outside of the curve an actual steering angle ($\alpha$) ranging from 150% and 220% of the desired steering angle ($\alpha_{TGT}$).

3. The control method according to claim 1 and comprising the further step of applying, while driving along the curve, and in response to the desired steering angle ($\alpha_{TGT}$) is being smaller than the threshold value (TH), to the rear wheel (3) on the outside of the curve an actual steering angle ($\alpha$) that is equal to twice the desired steering angle ($\alpha_{TGT}$).

4. The control method according to claim 1, wherein the threshold value (TH) ranges from 0.2° to 0.4°.

5. The control method according to claim 1, wherein the threshold value (TH) is equal to 0.3°.

6. The control method according to claim 1, wherein the threshold value (TH) is always constant in all conditions.

7. The control method according to claim 1, wherein the threshold value (TH) is variable depending on a longitudinal speed of the road vehicle (1), depending on a transverse acceleration of the road vehicle (1) and/or depending on an actual steering angle of the front wheels (2).

8. A method to control a road vehicle (1) with rear steering wheels (3); wherein the road vehicle (1) comprises two actuators (15), which are independent of one another and each actively controls the variation of a steering angle ($\alpha$) of a corresponding rear wheel (3) so that each actuator (15) can impart to its own rear wheel (3) a steering angle ($\alpha$) that is different from a steering angle ($\alpha$) of the other rear wheel (3); the method comprises, while driving along a curve, the steps of:

determining a threshold value (TH) different from an actual steering angle ($\alpha$) of the rear wheels (3);

determining a desired steering angle ($\alpha_{TGT}$) for the rear wheels (3); comparing the desired steering angle ($\alpha_{TGT}$) with the threshold value (TH);

in response to the desired steering angle ($\alpha_{TGT}$) is being greater than the threshold value (TH), applying to both rear wheels (3) a same actual steering angle ($\alpha$) that is equal to the desired steering angle ($\alpha_{TGT}$); and in response to the desired steering angle ($\alpha_{TGT}$) being smaller than the threshold value (TH), applying to a rear wheel (3) on the outside of the curve an actual steering angle ($\alpha$) greater than the desired steering angle ($\alpha_{TGT}$) and applying to a rear wheel (3) on the inside of the curve a zero actual steering angle ($\alpha$);

wherein the threshold value (TH) ranges from 0.2° to 0.4°.

9. A method to control a road vehicle (1) with rear steering wheels (3); wherein the road vehicle (1) comprises two actuators (15), which are independent of one another and each actively controls the variation of a steering angle ($\alpha$) of a corresponding rear wheel (3) so that each actuator (15) can impart to its own rear wheel (3) a steering angle ($\alpha$) that is different from a steering angle ($\alpha$) of the other rear wheel (3); the method comprises-and comprising, while driving along a curve, the steps of:

determining a threshold value (TH) different from an actual steering angle ($\alpha$) of the rear wheels (3);

determining a desired steering angle ($\alpha$TGT) for the rear wheels (3); comparing the desired steering angle ($\alpha_{TGT}$) with the threshold value (TH);

in response to the desired steering angle ($\alpha_{TGT}$) is being greater than the threshold value (TH), applying to both rear wheels (3) a same actual steering angle ($\alpha$) that is equal to the desired steering angle ($\alpha_{TGT}$); and in response to the desired steering angle ($\alpha_{TGT}$) being smaller than the threshold value (TH), applying to a rear wheel (3) on the outside of the curve an actual steering angle ($\alpha$) greater than the desired steering angle ($\alpha_{TGT}$) and applying to a rear wheel (3) on the inside of the curve a zero actual steering angle ($\alpha$);

wherein the threshold value (TH) is always constant in all conditions.

10. A method to control a road vehicle (1) with rear steering wheels (3); wherein the road vehicle (1) comprises two actuators (15), which are independent of one another and each actively controls the variation of a steering angle ($\alpha$) of a corresponding rear wheel (3) so that each actuator (15) can impart to its own rear wheel (3) a steering angle ($\alpha$) that is different from a steering angle ($\alpha$) of the other rear wheel (3); the method comprises, while driving along a curve, the steps of:

determining a threshold value (TH) different from an actual steering angle ($\alpha$) of the rear wheels (3);

determining a desired steering angle ($\alpha_{TGT}$) for the rear wheels (3); comparing the desired steering angle ($\alpha_{TGT}$) with a threshold value (TH);

in response to the desired steering angle ($\alpha_{TGT}$) is being greater than the threshold value (TH), applying to both rear wheels (3) a same actual steering angle ($\alpha$) that is equal to the desired steering angle ($\alpha_{TGT}$); and in response to the desired steering angle ($\alpha_{TGT}$) being smaller than the threshold value (TH), applying to a rear wheel (3) on the outside of the curve an actual steering angle ($\alpha$) greater than the desired steering angle ($\alpha_{TGT}$) and applying to a rear wheel (3) on the inside of the curve a zero actual steering angle ($\alpha$);

wherein the threshold value (TH) is variable depending on a longitudinal speed of the road vehicle (1), depending on a transverse acceleration of the road vehicle (1) and/or depending on an actual steering angle of the front wheels (2).

* * * * *